3,836,675
PURIFICATION OF YELLOW PHOSPHORUS
Gerhard Hartlapp, Hurth-Hermulheim, Hans Haas, Hurth-Knapsack, and Karl-Heinz Stendenbach, Bruhl, Germany, assignors to Knapsack Aktiengesellschaft, Knapsack, Germany
Filed July 17, 1972, Ser. No. 272,436
Claims priority, application Germany, July 16, 1971, P 21 35 546.4
Int. Cl. C01b 25/02, 25/04
U.S. Cl. 423—322     7 Claims

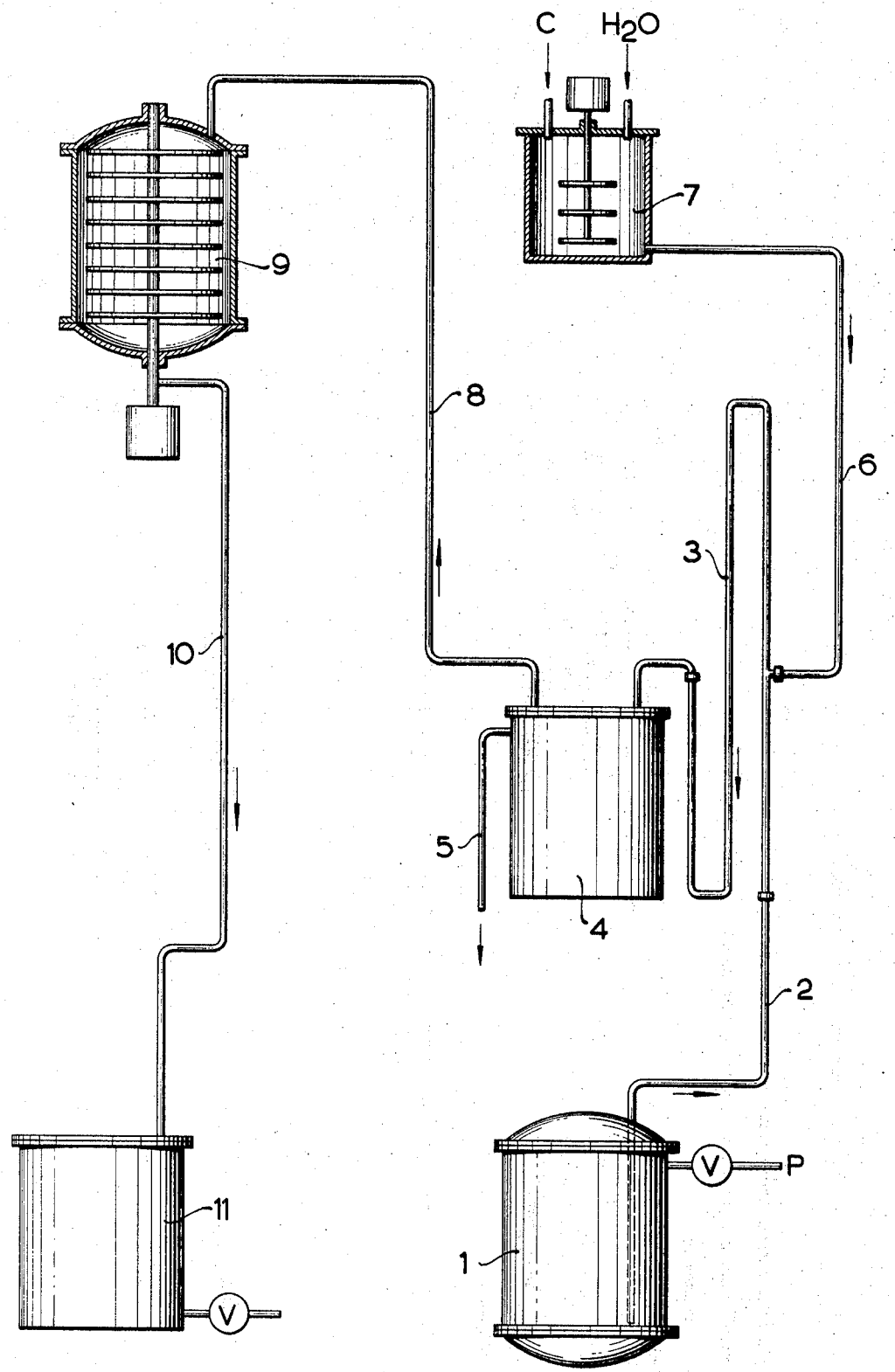

ABSTRACT OF THE DISCLOSURE

Purification of yellow phosphorus. Phosphorus is mixed in a mixing zone with between 0.5 and 5 weight percent of an aqueous suspension of active carbon containing between 50 and 500 kg./cubic meter of active carbon, the percentages being based on phosphorus, the active carbon and the phosphorus are allowed to remain in contact with one another for a period of time between 0.5 and 15 minutes, and the phosphorus is filtered in a filtration zone so as to separate the active carbon therefrom.

---

The present invention relates to a process for the purification of yellow phosphorus comprising mixing liquid yellow phosphorus and active carbon together in the presence of water and, following a certain contact time, freeing the resulting mixture from the active carbon component therein, and to an apparatus for carrying out this process.

It is known that elementary yellow phosphorus is a useful starting material for the manufacture of phosphorus derivatives, such as $P_2S_5$, for example. To this end, it is often necessary, however, first to free the phosphorus from contaminants which are contained therein. The purification of phosphorus by subjecting it to treatment with concentrated sulfuric acid has already been described. Sometimes, however, the reactor may be found to show the phenomenon of local overheating. This in turn may initiate self-ignition of the phosphorus and culminate in fire-outbreaks and explosions.

It has also been described that phosphorus can be purified by subjecting it to treatment with polyphosphoric acid and active carbon or with a mixture of active carbon and bleaching earth with the resultant formation of phosphorus containing 0.005% of inorganic contaminants and between 0.009 and 0.01% of organic contaminants.

This process is not fully satisfactory firstly because it has to be carried out to the exclusion of water and secondly because it does not permit the concentration of organic compounds in the final product to be reduced to a value lower than 0.009%.

It should not be ignored, however, that the use of phosphorus containing less than 0.001% of organic contaminants is critical for the production of qualitatively reliable phosphorus products, especially $P_2S_5$.

A further process has been described, wherein yellow phosphorus and active carbon, which are used in a ratio by weight of 1:0.1, are stirred together for 1 hour at temperatures between 60 and 90° C., in the presence of water. Following this, the mixture so made is freed from the active carbon component therein.

A still further process has been described, wherein the active carbon treatment is combined with further purifying treatment in an attempt to free the phosphorus not only from organic but also from inorganic contaminants, except for traces thereof, so as to obtain very pure phosphorus for use in electrical engineering. More particularly, phosphorus, lead and aluminum are refluxheated for 1 hour to 800° C. (the phosphorus and lead are used in a ratio by weight of 1:1 and the phosphorus and aluminum are used in a ratio by weight of 1:0.1), the resulting mixture is allowed to cool and then distilled under a vacuum between 5 and 9 mm. of Hg, at 260–270° C. Active carbon is added to the distilled phosphorus in a ratio by weight of 0.1:1 and the whole is stirred for 1 hour. Following the addition of nitric acid with a strength of 15%, the whole is subjected to steam distillation. The resulting phosphorus, which contains less than 3 p.p.m. (p.p.m. stands for parts per million) of inorganic contaminants and 9.8 p.p.m. of organic contaminants, is very pure.

This latter process can be carried out intermittently only at the price of high active carbon consumption rates, which is disadvantageous. Still further, the process is so complicated and expensive from both economic and technical aspects that the operation therewith is limited to a laboratory scale.

It is an object of the present invention to provide a technically simple and economic process for the continuous manufacture of phosphorus containing less than 0.001% of contaminants, particularly organic contaminants.

The process of the present invention comprises more particularly mixing in a mixing zone phosphorus with between 0.5 and 5 weight percent, preferably between 1 and 3 weight percent, of an aqueous suspension of active carbon containing between 50 and 500 kg./cubic meter, preferably 150 kg./cubic meter, of active carbon, the percentages being based on phosphorus, allowing the active carbon and the phosphorus to remain in contact with one another for a period of time between 0.5 and 15 minutes, preferably 2 minutes, and filtering in a filtration zone the phosphorus so as to separate the active carbon therefrom.

A preferred embodiment of the present process comprises using active carbon with an inner surface area of at least 800 s.c.m./gram and removing from the filtration zone the active carbon filter cake, which is obtained therein, by centrifugation.

The liquid phosphorus and active carbon suspension should conveniently be mixed together in countercurrent fashion, optimum results being produced by conveying the active carbon suspension and the phosphorus countercurrently with respect to one another through the ascending and descending portions of a U-shaped tube arranged in upright position, which may be heated, if desired.

The purification may be further improved by mixing the phosphorus and active carbon suspension together by conveying them through a mixing zone countercurrently with respect to one another, delivering the resulting mixture to a filtration zone, separating therein the active carbon component from the liquid phase by removing the filter cake from the filtration zone by centrifugation, collecting the liquid phase, allowing the phosphorus to deposit and repeating the phosphorus treatment with the aqueous active carbon suspension, once or several times.

The process of the present invention has very beneficial effects, which primarily reside in the formation of very pure material (less than 0.001% of contaminants) for a low active carbon consumption rate (substantially 2.5%, based on the phosphorus used). In addition to this, the process is easy to carry out in continuous manner under commercially attractive conditions and is more reliable in operation than conventional methods.

An apparatus for use in carrying out the process of the present invention will now be described with reference to the accompanying drawing.

As can be seen, the apparatus comprises a phosphorus container 1 communicating through a conduit 2, which opens into U-shaped tube 3 that is about 10 meters high and extended vertically upwards, with an intermediate container 4 fitted with a water overflow 5. Placed upstream of container 1 is an agitator vessel 7 having an outlet pipe 6, which opens into the ascending part of U-shaped tube 3, extending vertically upwards over a height of substantially 10 meters. Agitator vessel 7 is provided for preparing the active carbon suspension therein. Intermediate container 4 is further fitted with a conduit 8 running to a centrifugal filter 9 which is provided with an outlet pipe 10 connecting filter 9 to collecting tank 11 and delivering purified phosphorous to tank 11.

The following examples further illustrate the process of the present invention.

EXAMPLE 1

20 tons of phosphorus containing 0.28 weight percent of organic contaminants were mixed with 200 kg. of active carbon, which had an inner surface area of 800 sq. m./g. The active carbon was used in the form of an aqueous 15 weight percent suspension. Following a contact time of 2 minutes, the mixture so made was filtered. The concentration of the organic contaminants in the phosphorus so treated was found to have been reduced down to 0.018 weight percent.

EXAMPLE 2

10 tons of the phosphorus pre-purified in the manner described in Example 1 and containing 0.018 weight percent of organic contaminants, were mixed with an aqueous 15 weight percent suspension of 150 kg. of active carbon, which had an inner surface area of 800 sq. m./g. Following a contact time of 2.5 minutes and following filtration, the concentration of the organic contaminants in the phosphorus so treated was foud to have been reduced down to less than 0.0001 weight percent.

We claim:

1. A process for purifying yellow phosphorus, wherein liquid yellow phosphorus and active carbon are mixed together in the presence of water and thereafter the resulting mixture is freed from the active carbon, which process comprises mixing countercurrently in a mixing zone phosphorus with between 0.5 and 5 weight percent of an aqueous suspension of active carbon containing between 50 and 500 kg./cubic meter of active carbon having an inner surface of at least 800 square meters per gram, the percentages being based on phosphorus, allowing the active carbon and the phosphorus to remain in contact with one another for a period of time between 0.5 and 15 minutes whereby the phosphorus is caused to have less than 0.001% continents, and filtering in a filtration zone the phosphorus so as to separate the active carbon therefrom.

2. The process as claimed in claim 1, wherein the aqueous active carbon suspension contains 150 kg./cubic meter of active carbon.

3. The process as claimed in claim 1, wherein the phosphorus is mixed with between about 1 and 3 weight percent of the active carbon suspension, the percentages being based on phosphorus.

4. The process as claimed in claim 1, wherein the active carbon and the phosphorus are contacted for substantially 2 minutes.

5. The process as claimed in claim 1, wherein filter cake consisting of active carbon and obtained in the filtration zone is removed therefrom by centrifugation.

6. The process as claimed in claim 1, wherein the active carbon suspension and the phosphorus are conveyed countercurrently with respect to one another thorugh the ascending and descending portions of a U-shaped tube in upright position.

7. The process as claimed in claim 1, comprising mixing the phosphorus and active carbon suspension together by conveying them through a mixing zone countercurrently with respect to one another, delivering the resulting mixture to a filtration zone, separating therein the active carbon component from the liquid phase by removing filter cake from the filtration zone by centrifugation, collecting the liquid phase, allowing the phosphorus to deposit and repeating the phosphorus treatment with the aqueous active carbon suspension.

References Cited

FOREIGN PATENTS 1,143,794   2/1963   Germany _____ 423—322

OSCAR R. VERTIZ, Primary Examiner

G. A. Heller, Assistant Examiner